Jan. 23, 1968     C. B. BASINGER     3,365,563

BRAZING TOOL

Filed April 13, 1965     2 Sheets-Sheet 1

INVENTOR
CHARLES B. BASINGER
BY *Jerry K. Harness*
           *his* ATTORNEY

INVENTOR
CHARLES B. BASINGER
BY Jerry K Harness
his ATTORNEY

United States Patent Office 3,365,563
Patented Jan. 23, 1968

3,365,563
BRAZING TOOL
Charles B. Basinger, Parma, Mich., assignor to Aeroquip
Corporation, Jackson, Mich.
Filed Apr. 13, 1965, Ser. No. 447,697
4 Claims. (Cl. 219—9.5)

ABSTRACT OF THE DISCLOSURE

An improvement for a portable induction brazing tool which provides automatic control and shutoff of the power to the tool under predetermined conditions. A sensing device is inserted in a metallic carrier and disposed within the handle of the brazing tool adjacent the conduit. The sensing device is heated in response to the heating cycle and reacts at a predetermined temperature to control the cycle.

---

Figure 1:
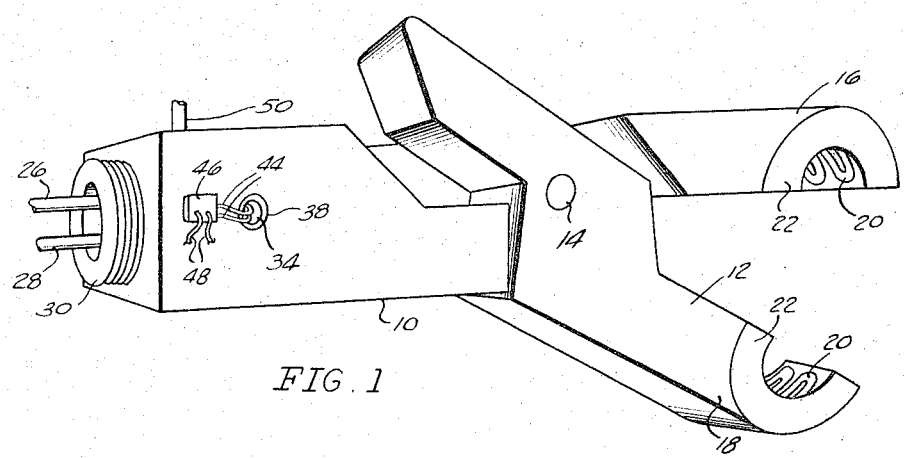

The invention pertains to induction heating apparatus, and particularly relates to induction heating apparatus wherein the maximum temperature of the article being heated may be closely regulated.

In induction heating processes an article or workpiece, usually metallic, is heated by inducing electromagnetic induction within the article by means of a high frequency or RF current. The curent may be generated by rotating generators or converters, motor-generator sets, vacuum-tube oscillators, or other known types of high frequency generating devices. When heating an article by electromagnetic induction, the maximum temperature produced in the article will be determined by the mass of the article, the article material, the current frequency and amperage, the physical dimension of the coil, and the length of duration of the electromagnetic induction within the article. In order to determine the temperature of the article during heating, various devices have been employed such as attaching a thermocouple to the article being heated or by employing a radiation pyrometer. Conventional temperature indicating devices are satisfactory for many applications wherein working space, shielding of the article being heated or the existence of scale does not render their use impractical. If a large number of identical articles are to be heated in a similar manner to a predetermined maximum temperature, the time required to heat the article may be regulated by timer switch means, and once the proper heating cycle duration has been determined, substantially uniform results will be obtained during the heating of each article. However, when the articles being heated sequentially vary in size, mass, material, etc., the maximum temperature obtained in the article cannot be easily controlled by a time or duration device without making changes in the control apparatus calibration.

The invention pertains to an induction heating apparatus which will very accurately control the maximum temperature obtained by the article being heated without the utilization of time switches. Rather, the duration of the generation of high frequency currents in accord with the invention is determined by the temperature attained in a control element subjected to the same high frequency induction which is being produced in the article to be heated. The control element is of a known mass, dimension and material, and is related to the conductors supplying the heating coil in a known manner whereby a definite relationship between the temperature of the control element and the temperature of the article being heated may be established. The temperature of the control element is sensed by a thermocouple during heating, and the thermocouple is connected to control means regulating operation of the high frequency current generator. By employing automatic switching means responsive to the temperature of the control element, and wherein the switching means is adapted to terminate generation of the high frequency current, the maximum temperature attained in an article may be accurately regulated. In order to produce uniform results with each cycle of operation, it is desirable to cool the control element to the ambient temperature, or a uniform cycle starting temperature, after each heating cycle and to this end cooling means are utilized.

The method and apparatus of the invention is particularly useful with relatively small and portable induction heating units. The invention is described in conjunction with apparatus capable of brazing stainless steel tubing joints in confined areas. As the clearance about the tubing is often restricted, the use of a tube-contacting thermocouple or radiation pyrometer to permit control of the maximum temperature produced is impractical. Also, as the brazing of stainless steel tubing is preferably done in a nonoxidizing atmosphere, the shielding means associated with the induction coil prevents visual inspection of the tube joint while being heated. The control element is preferably incorporated into the body member on which the induction coil is mounted, or is defined within an adapter which is attached to the induction coil body member, and the entire device may be manufactured and installed in a relatively compact unit.

It is, therefore, an object of the invention to provide a method of controlling an induction heating process wherein a control element is subjected to the same high frequency currents as the article being heated, and wherein the temperature of the control element is sensed to permit determination of the temperature of the article.

Another object of the invention is to provide an induction heating method and apparatus wherein accurate control of the maximum temperature attained in an article being heated is provided having a dependability and consistency of operation superior to known previous control systems.

An additional object of the invention is to provide a method and apparatus for induction heating wherein the duration of the heating cycle is regulated by a control element heated by the high frequency current passing through an induction coil, and wherein the temperature of the control element may be employed to automatically terminate the generation of the high frequency current when the temperature of the article being heated reaches the desired maximum temperature, whereby the final temperature of the article attained will be that maximum temperature desired.

Another object of the invention is to provide induction heating apparatus which is of a concise nature and is capable of accurately regulating the maximum temperature produced in an article being heated. The control means regulating the maximum temperature attained by the article is of a simplified nature and is capable of being cooled between heating cycles to an ambient temperature, thereby insuring uniform results during the cycles of operation.

Figure 2:
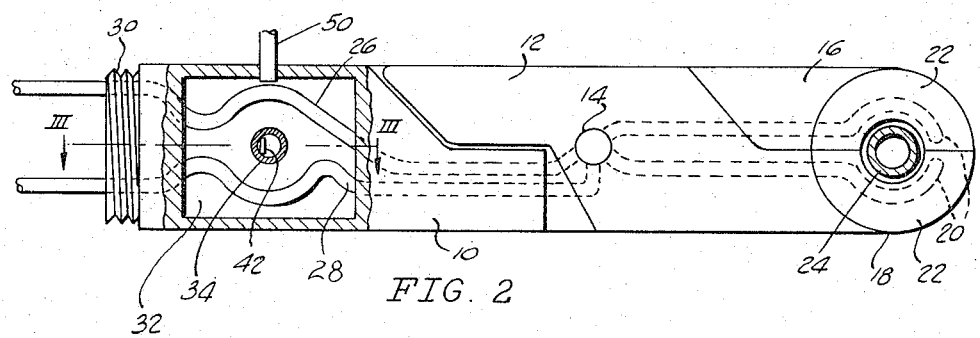
Figure 3:
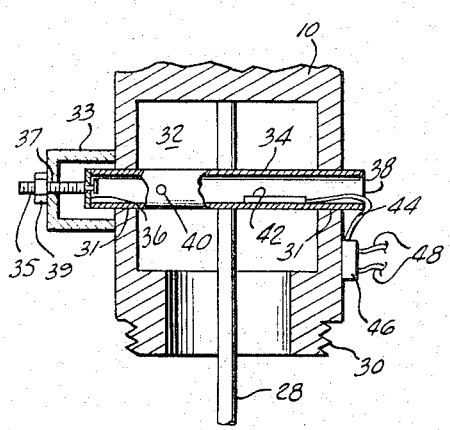
Figure 4:
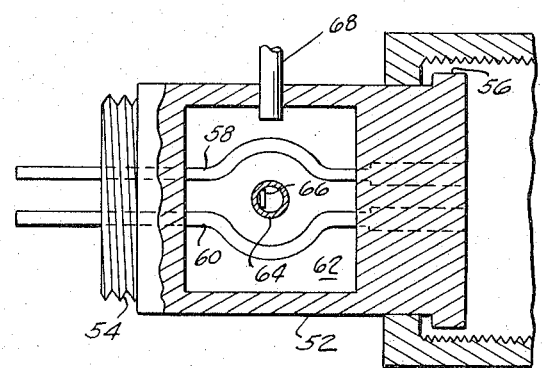
Figure 5:
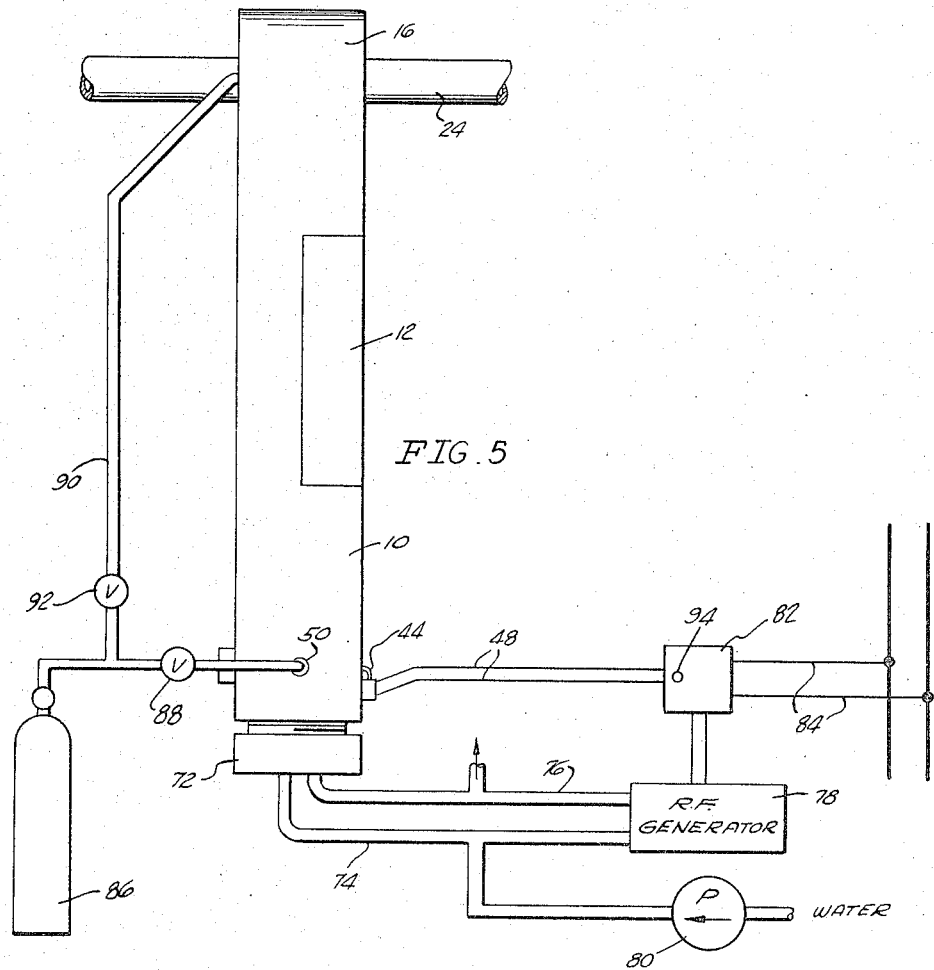
Figure 6:
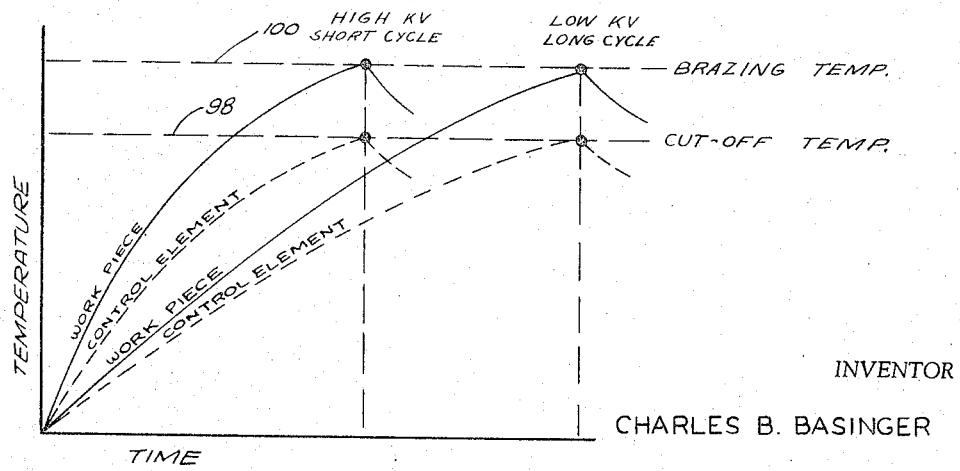

These and other objects of the invention arising from the details and relationships of the components of embodiments thereof will be apparent from the following description and accompanying drawings wherein:

FIG. 1 is a perspective view of a portable induction heating apparatus body member supporting an induction heating coil which may be opened or closed about tubing to be brazed, FIG. 2 is an elevational view of the apparatus of FIG. 1, the control element chamber of the device being broken away for purposes of illustration, FIG. 3 is a plan, elevational view through the body member chamber as taken along section III—III of FIG. 2, a portion of the control element wall being broken away, FIG. 4 is an elevational view of an adapter incorporating the control element and chamber of the invention, a portion thereof being broken away for purposes of illustration, FIG. 5 is a schematic view of an induction heating system incorporating the concept of the invention, the induction heating coil support body member being enlarged and out-of-proportion relative to the other components, for purposes of illustration, and FIG. 6 is a graph illustrating time and temperature relationships during various lengths of heating cycles.

While the inventive concept is described and illustrated in a tool which is particularly adapted for brazing stainless steel tube in location, it is to be appreciated that the invention is not limited to this particular application, and that the principles of the invention may be employed with many types of induction heating apparatus.

FIGS. 1, 2 and 3 illustrate an induction heating tool consisting of an elongated body member 10 which is provided with an arm 12 pivotally mounted to the body by a pivot pin 14. The body member 10 thereby includes jaw portions 16 and 18 which may be separated upon pivoting of the arm 12. The jaw portions 16 and 18 are of such configuration as to receive high frequency induction heating coils 20 and are provided with shields 22 wherein upon the jaws being closed as shown in FIG. 2 and a tube 24 to be brazed, interposed between the jaws, the tube may be closely encompassed by the shields 22 wherein the axial portion of the tube in alignment with the heating coils 20 may be quickly heated to a brazing temperature upon high frequency current being supplied to the heating coils.

High frequency current conductors located within the body member 10 consist of metallic tubes 26 and 28 which communicate with the tubular conduits constituting the heating coils 20. As is the usual practice, a cooling water may flow through the conductor tubes and the heating coils 20. At the opposite end of the body member 10, with respect to the jaw portions 16 and 18, a threaded projection 30 is defined upon the body member through which the conductors 26 and 28 extend. A swivel adapter, or other conventional induction heating apparatus may be attached to the body member 10 by means of the threaded projection 30.

As apparent in FIG. 2 and FIG. 3, a chamber 32 is defined in the body member 10. The chamber 32 is so located that the high frequency current conductors 26 and 28 pass therethrough and the conductors are shaped, as will be apparent from FIG. 2 to be in spaced relation to each other within the chamber and as to define a generally circular clearance at the central portion of the chamber.

A tubular control element 34 is slidably mounted in the body member to extend through the chamber 32 in a direction transversely disposed to the direction of the conductors 26 and 28. As will be apparent from FIG. 2, the control element 34 extends concentrically through the "circular" clearance defined by the conductors 26 and 28. The control element 34 is in the form of a metallic tube and includes a closed end 36 and an open end 38 which communicates with the atmosphere. An opening 40 is defined in the wall of the control element removed from the open end 38, whereby introduction of a cooling gas into the chamber 32 will permit the cooling gas to flow into the control element 34 through the opening 40 and exhaust into the atmosphere through the open end 38.

A thermocouple 42 is affixed to the inner wall of the control element 34 whereby the temperature of the control element may be accurately sensed. Leads 44 extend from the thermocouple 42 and through the control element open end 38 to a junction box 46 affixed to the side of the body member 10. Leads 48 extend from a junction box 46 for connection to control apparatus as will later be described.

In order to permit a degree of adjustment in the "cutoff" temperature of the tool without requiring adjustment of the electrical control apparatus to which the thermocouple 42 is connected, means are provided for adjusting the position of the control element 34, and thermocouple, relative to the conductors 26 and 28. The control element 34 is slidably mounted on the body member 10 within bores 31 and is of sufficient length that significant lateral adjustment relative to the body member is possible. A spider 33 is attached to the side of body member 10 over the control element closed end 36 and a threaded shaft 35 is received within a threaded bore 37 defined in the spider. The inner end of shaft 35 is rotatably attached to end 36 and the outer end may be slotted to permit shaft rotation by a screwdriver.

It will be appreciated that rotation of the shaft 35 will transversely shift the control element 34 and thermocouple 42 relative to the conductors 26 and 28. As this shifting adjusts the distance of the thermocouple relative to the conductors, an adjustment of the time required for the thermocouple to attain a predetermined temperature when the conductors are energized, is provided. Lock nut 39 is used to lock the the position of the control element.

A conduit 50 adapted to be connected to a supply of a cooling medium, such as a gas, is affixed to the body member 10 in communication with the chamber 32. Upon the cooling medium being introduced into the chamber 32, the medium will flow through the control element opening 40 and through the control element length to cool the element to the ambient temperature, or the temperature of the cooling medium, in a short time.

FIG. 4 discloses a modification of the invention whereby the chamber and control element need not form an integral part of the induction coil body member but, rather, may be formed on an adapter which is threadedly connected to a high frequency induction coil support body member. This adapter permits the concept of the invention to be used with conventional induction heating tools. In the embodiment of FIG. 4, the generally cylindrical member 52 is provided with threads 54 at its outer end and is formed with an annular shouldered head 56 at the other end.

Tubular high frequency conductors 58 and 60 axially extend through the member 52, and a chamber 62 is defined therein in a manner similar to the chamber 32 formed in the apparatus illustrated in the FIGS. 1, 2 and 3. The conductors 58 and 60 are formed as illustrated within the confines of the chamber 62, and a control element 64 is fixed within the chamber equally spaced between the conductors. A thermocouple 66 is affixed to the inside of the control element 64 and its leads, not shown, extend from an open end of the control element which communicates with the atmosphere in the manner of the previously described embodiment. A cooling gas conduit 68 is affixed to the member 52 in communication with the chamber 62 whereby a cooling medium may be introduced into the chamber for flow into the control element through an opening similar to the opening 40 of the previously described embodiment.

An internally threaded nut 70 is located upon the member 52 whereby the unit illustrated in FIG. 4 may be attached to a threaded projection, or similar component, defined upon an induction heater tool or head. The conductors 58 and 60 may be formed into sockets adjacent the right end of the member 52 as to receive the conductors of the induction heater tool head with which the device is to be employed. Thus, upon attachment of the described adapter embodiment of FIG. 4 to the conventional conductor induction heating tool head, the inventive concepts hereafter described may be employed in a manner similar to that produced with the embodiment of FIGS. 1, 2 and 3.

In the embodiment of FIG. 4, the control element 64 need not be mounted for lateral movement relative to the body member 52, since the adapter may be used with a variety of coil heads and adjustment of the cutoff temperature is most practically regulated at the electrical control apparatus sensing the temperature of thermocouple 66.

In use, the previously described tool of the embodiment of FIGS. 1, 2 and 3 would be connected to the associated apparatus in a manner schematically illustrated in FIG. 5. For purposes of illustration, the body member 10, shown in FIG. 5, is considerably enlarged relative to the other components of the system.

A swivel connector 72 connects the high frequency conductors 74 and 76 to the tool body member conductors 26 and 28. The conductors 74 and 76 are connected to a high frequency generator 78. A water pump 80 is shown as supplying water to conductor 74, which is exhausted from conductor 76, to maintain the RF conductors at a relatively cool operating temperature. The RF generator may be of any type suitable to produce the desired frequency for the heating. The RF generator is energized through a switching device 82 connected to the power source conductors 84. The switching device 82 is also connected to the leads 48 extending from the junction box 46 located on the side of the body member 10. The switching device 82 includes suitable amplifying and indicating equipment associated with appropriate relays to actuate a switch controlling the RF generator as to open the switch and terminate generation of high frequency current upon a predetermined temperature existing within the control element as sensed by the thermocouple 42 located within the control element 34.

A gas cylinder 86 of an inert and cooling medium gas, such as argon, is connected to the cooling medium conduit 50 through a valve 88. A conduit 90 is also provided communicating with the gas cylinder 86 and permitting the gas to flow into the shielded portion of the jaws 16 and 18 as controlled by a valve 92. By use of the valves 88 and 92, the flow of the argon gas to either the cooling medium conduit 50 or the conduit 90, or both, may be regulated.

In operation, the RF generator 78 will be initially de-energized and no gas will be flowing through the valves 88 and 92. The control element 34 will be at the ambient temperature, or a predetermined temperature. To use the method and apparatus of the invention, the operator will open the jaw portions 16 and 18 of the body member to permit the joint of the tubing 24 to be brazed to be placed within the axial confines of the jaw portions. The jaws will then be closed whereby the shields 22 closely encompass the tube forming a chamber about the tube in which the induction heating coils 20 are located. The valve 90 will then be opened to permit the inert argon gas to fill the chamber defined by the jaw portions 16 and 18 and remove the oxidizing atmosphere from the tube portion to be heated. The operator will then energize the generator 78 by depressing a "start" button which may be located at 94 on the switching device 82. The generation of high frequency current by the generator 78 will cause electromagnetic induction to occur within the tube material encompassed by the heating coils 20 and the tube will begin to be heated. As the high frequency current being supplied to the heating coil 20 is being conducted through the conductor portions located within the chamber 32, the control element 34 will rise in temperature at a rate related to the increase in temperature of the tube material encompassed by the heating coils 20. The switching device 82 will have been previously adjusted to de-energize the generator 78 upon the temperature of the control element 34 reaching a predetermined value indicative of the arrival of the tube material heat level to the desired maximum temperature. As the element 34 rises in temperature, the thermocouple 42 senses this temperature and, through appropriate relays, will actuate the switching device 82 to de-energize the generator 78 when the maximum desired tube temperature is reached. By de-energizing the generator 78 at the desired time, the induction heating can be accurately controlled to permit the maximum temperature to be reached, and then the tube 24 will begin to cool. Of course, the brazing of the tube 24 occurs during the higher article temperatures, and the accomplished purpose of the heating operation has been achieved.

After the generator 78 has been de-energized, the valve 88 is opened to permit argon gas to flow into the chamber 32 and through the control element 34 to atmosphere through the open end 38 to cool the control element to a uniform "cooled" temperature and, thereby, prepare the control element for the next heating cycle. After the control element has reached the desired temperature, the valve 88 may be closed. The valve 92 will be closed upon the tube being removed from the joint previously heated.

When using heating tools as constructed in accord with the embodiment of FIGS. 1, 2, 3, and 5, a variety of different tools may be sequentially used with the generator and temperature control circuits without changing the setting on the switching device 82. By merely laterally positioning the control element 34 relative to the conductors 26 and 28, each tool may be individually "set" to compensate for any variable characteristics present to produce the proper "cutoff" temperature. The further the thermocouple 42 is positioned from the plane of the conductors 26 and 28, the longer the time required to heat the thermocouple to the desired cutoff temperature and the longer the heating duration will be. Thus, tool heads may be interchanged without adjustment of the control apparatus and, yet, a uniform temperature at the workpiece being heated is produced.

While the previously described operation of switching device 82 is automatic, it will be appreciated that a semi-automatic operation can be achieved by employing an indicator with the thermocouple 42 to indicate the temperature of the control element 34. Upon the temperature of the control element reaching a predetermined value, a manual switch could be operated to de-energize the generator 78. To simplify the heating process and to obtain maximum control over the operation, automatic control of the RF generator through the switching device 82 is preferred.

FIG. 6 illustrates temperature-time relationships for short and long cycles of operation. A short cycle is produced by using a high kv. and use of a low kv. produces a long cycle. The control element cutoff temperature is indicated by line 98, and the brazing temperature of the workpiece is indicated by line 100. It will be noted that the curves begin to "droop" as they approach the maximum desired brazing temperature. This "drooping" of the curves is caused by the rapid increase of heat loss at the higher temperatures. For optimum performance and control, the control element cutoff temperature should be attained before the time-temperature curve begins to droop, because the greater the rate of temperature rise the more accurate the cutoff point. To permit the control element cutoff temperature to be so located, the heat loss factors must be reduced as much as possible. The heat loss factors may be reduced by using a cutoff temperature significantly lower than the brazing temperature to cut down radiation and conduction losses.

From FIG. 6 it will be noted that regardless of the kv. and whether a short or long cycle is taking place, the same cutoff and brazing temperature is produced. Thus, it is not necessary to accurately set the generator output and line voltage fluctuations will not affect the final temperature attained.

The length of the heating cycle may also be regulated by varying the wall thickness or mass of the control element, or by changing the spacing between the conductors 26 and 28 existing within the chamber 32, and these factors are a consideration when designing the tool components. For brazing a particular size tube 24, a given control element 34 will produce accurate and consistent results during each heating cycle. As the control of the heating cycle produced by the control element depends upon the initial temperature of the control element, it is important that the control element be cooled to the desired "starting" temperature prior to each heating cycle. Thus, it is desirable that the switching device 82 include a switching component preventing a new heating cycle from being initiated until the heating element 34 has cooled to the desired temperature.

The operation and function of the embodiment of FIG. 4 is identical to that described above and need not be further described.

It will, therefore, be appreciated that the method and apparatus of the invention permits an induction heating cycle to be accurately controlled by sensing the temperature of a control element which is directly related to the characteristics of the high frequency current being supplied to the heating coil. Thus, variations in the voltage and current, within limits, will not cause variations in the final temperature attained in the article being heated, and consistent and uniform heating results can be attained.

It is appreciated that various modifications to the inventive concept may be apparent to those skilled in the art without depatring from the spirit and scope thereof, and it is intended that the invention be defined only by the scope of the following claims.

I claim:

1. Induction brazing apparatus comprising, in combination,
    (a) first and second body members forming a brazing enclosure,
    (b) a chamber defined in one of said members spaced from said enclosure,
    (c) an electrical power source connected to said one body member,
    (d) a high frequency current conductor carried by said one body member, extending through said chamber and communicating with said brazing enclosure,
    (e) a control element mounted on said one body member and positioned within said chamber adjacent said conductor whereby said element is heated by said conductor upon a high frequency current passing therethrough,
    (f) temperature sensing means affixed to said control element adapted to sense the temperature thereof,
    (g) means connecting said sensing means with said power source, and
    (h) adjustment means interconnected between said control element and said one body member for selectively positioning said control element relative to said conductor for selectively varying the distance of said sensing means from said conductor.

2. Induction brazing apparatus as in claim 1 wherein:
    (a) a cooling fluid conduit is mounted on said one body member in communication with said chamber adapted to selectively subject said control element to a cooling medium.

3. Induction brazing apparatus as in claim 1 wherein:
    (a) said control element comprises a metallic tube having said sensing means fixed to the interior thereof.

4. Induction brazing apparatus as in claim 1 wherein:
    (a) said control element comprises a metallic tube having an open end, said open end communicating with the atmosphere surrounding said one body member, and
    (b) an opening defined in said tube remote from said open end and in communication with said chamber.

References Cited

UNITED STATES PATENTS

| | | | |
|---|---|---|---|
| 2,041,029 | 5/1936 | Stargardter | 219—10.41 |
| 3,097,283 | 7/1963 | Giacchetti | 219—10.77 |
| 3,268,703 | 8/1966 | Schoppman et al. | 219—9.5 |

RICHARD M. WOOD, *Primary Examiner.*

L. H. BENDER, *Assistant Examiner.*